United States Patent [19]

Heyman et al.

[11] Patent Number: 5,046,456
[45] Date of Patent: Sep. 10, 1991

[54] ILLUMINATED COLLAR

[75] Inventors: Barbara C. Heyman, Beverly Hills; William J. Inman; Scott A. Kraft, both of Agoura Hills, all of Calif.

[73] Assignee: Protect A Pet, Inc., Beverly Hills, Calif.

[21] Appl. No.: 671,129

[22] Filed: Mar. 18, 1991

[51] Int. Cl.$^5$ .............................................. A01K 27/00
[52] U.S. Cl. ....................................... 119/106; 362/108
[58] Field of Search ............... 119/106, 109; 362/104, 362/108, 236, 237, 240, 806, 103; 24/16 PB; 40/665

[56] References Cited

U.S. PATENT DOCUMENTS

| | | | |
|---|---|---|---|
| 3,641,333 | 2/1972 | Gendron | 362/108 |
| 3,944,803 | 3/1976 | Chao | 362/108 |
| 4,173,201 | 11/1979 | Chao et al. | 119/106 |
| 4,887,552 | 12/1989 | Hayden | 119/109 |
| 4,895,110 | 1/1990 | LoCascio | 119/106 |
| 4,909,189 | 3/1990 | Minotti | 119/106 |
| 4,956,931 | 9/1990 | Selke | 119/106 X |

FOREIGN PATENT DOCUMENTS

| | | | |
|---|---|---|---|
| 771930 | 10/1934 | France | 119/106 |
| 2579417 | 10/1986 | France | 119/106 |
| 319781 | 10/1930 | United Kingdom | 119/106 |

Primary Examiner—Robert P. Swiatek
Assistant Examiner—Todd E. Manahan
Attorney, Agent, or Firm—Allan M. Shapiro

[57] ABSTRACT

An illuminated collar for improving night time visibility of a pet comprising a hollow flexible light-permeable tube having first and second ends and a plurality of lights mounted within the tube. A housing is mounted on the first tube end and contains a circuit for operating the lights and a battery for providing power for the circuit and the lights. A plurality of catch pins project from the housing. A buckle includes a ring mounted on the second tube end, a connector projecting from the ring, and a plurality of buckle holes in the connector so that the catch pins and buckle holes are selectively engageable and disengageable for connecting and disconnecting the first and second ends with respect to each other.

3 Claims, 1 Drawing Sheet

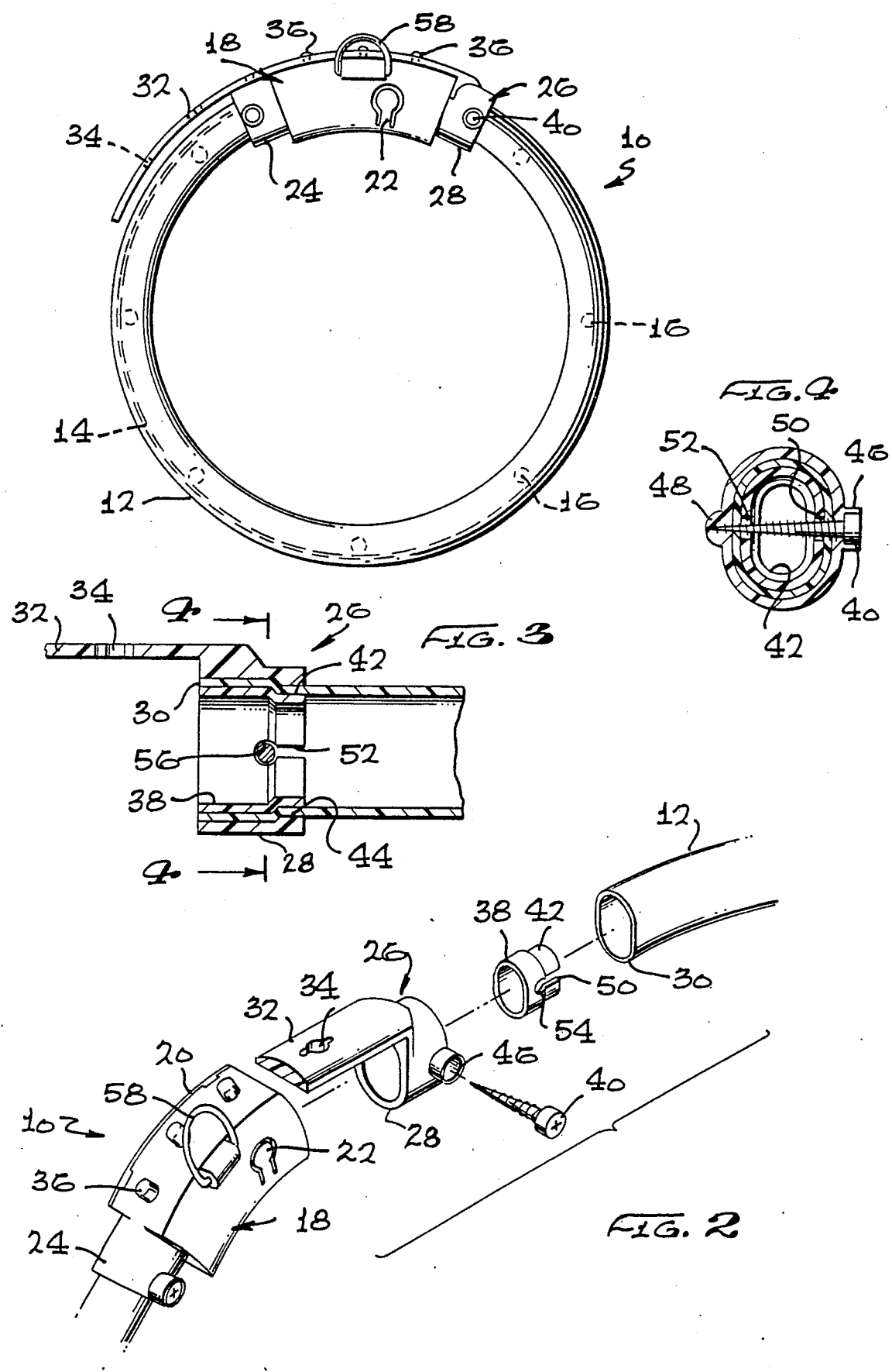

ILLUMINATED COLLAR

FIELD OF THE INVENTION

This invention is directed to an illuminated collar for improved night time visibility of a pet by means of flashing lights.

BACKGROUND OF THE INVENTION

Nighttime visibility is desirable for pets and other animals. Reflective sweaters and straps are good indicators of the presence of the animal when the observer is in an automobile bearing down on the animal, assuming the automobile headlights are operating. Many situations exist where the animal and, thus, the observer do not have the benefit of direct and adequate light impinging upon the animal. Some people have attached small flashlights to pet collars, but such expedients are cumbersome and mostly inadequate for many situations such as, for example, protecting a pet wandering in the night from collision with a car, finding a lost or wandering pet and providing automatic attention-getting displays for pets and other animals in the night.

SUMMARY OF THE INVENTION

In order to aid in the understanding of this invention, it can be stated in essentially summary form that it is directed to an illuminated collar comprising a hollow flexible light-permeable tube adapted to be worn around the neck of a pet, with a plurality of lights mounted within the tube. A housing is mounted on a first tube end and contains conventional circuit means for operating the lights and conventional battery means for providing power for the circuit means and the lights. A plurality of catch pins project from the housing. A buckle includes a ring mounted on a second tube end, a connector projecting from the ring, and a plurality of buckle holes in the connector so that the catch pins and buckle holes are selectively engageable and disengageable for connecting and disconnecting the first and second ends with respect to each other when the collar is wrapped around the desired portion of the animal. Secure connection of the housing and the buckle to the respective ends of the flexible tube are assured by means of interlocking rings and screw fasteners.

It is, thus, an object and advantage of this invention to provide an illuminated collar which is easy to use, inexpensive and reliable to manufacture and assemble, and capable of improving nighttime visibility of the pet wearer.

The features of the present invention which are believed to be novel are set forth with particularity in the appended claims. The present invention, both as to its organization and manner of operation, together with further objects and advantages thereof, may be understood best by reference to the following description, taken in conjunction with the accompanying drawings.

BRIEF DESCRIPTION OF THE DRAWINGS

FIG. 1 is an elevational view of an illuminated collar in accordance with this invention.

FIG. 2 is an enlarged fragmentary exploded perspective view of the housing and buckle portions of the collar.

FIG. 3 is a fragmentary enlarged sectional view of the buckle and its fastener elements on the end of the collar tube.

FIG. 4 is a sectional view taken in the direction of the arrows along line 4—4 in FIG. 3.

DESCRIPTION OF THE PREFERRED EMBODIMENTS

Referring to the drawings, an illuminated collar in accordance with this invention is indicated generally at 10 and is seen to comprise a hollow tube 12 preferably composed of a thermoplastic copolymer material which is flexible so that it can be looped into a circular form about the desired portion of the wearer, such as the neck of a dog, cat or other pet. Preferably, the tube 12 is slightly resilient so that it has a soft feel and non-bruising effect. The tube 12 is light permeable and may vary from totally clear to different degrees of translucency and color. A string of wires is illustrated generally in broken lines at 14 in FIG. 1 and includes a plurality of lights such as light 16, for example. A housing 18 is hollow and includes a conventional light-flashing electronic circuit (not shown) connected to the wires 14 of the string of lights 16. Also included within the housing 18 are conventional batteries (not shown) which provide power for both the electronic circuit and the lights 16. A lid 20 (FIG. 2) provides access to the battery compartment in the housing 18. A spring portion 22 of the housing 18 is manually depressable for actuating an on-off switch (not shown) in the electronic circuit. The housing 18 is integrally provided with a retaining ring 24 for secure attachment to one end of the tube 12. A buckle, indicated generally at 26, includes a second retaining ring 28 for secure attachment to the other end 30 of the tube 12, as will be described in more detail later. In the buckle 26, the retaining ring 28 is integrally provided with a connector strap 32 which projects in a direction parallel to the axis of the tube 12 and is provided with a plurality of buckle holes 34. The housing 18 is integrally provided with a plurality of catch pins, such as pin 36, arranged in the same direction and in alignment with buckle holes 34. The catch pins 36 and the buckle holes 34 are selectively engageable and disengageable with respect to each other for connecting and disconnecting the ends of the collar 10 with respect to each other. The buckle holes 34 are spaced throughout the length of the connector strap 32 so that the size of the loop formed by the tube 12 is adjustable.

Referring to FIGS. 2, 3 and 4, the retaining ring 28 of buckle 26 is secured to the end 30 of tube 12 by means of a locking ring 38 and a screw 40. The locking ring 38 has a flange 42 with a reduced outer diameter, and retaining ring 28 has a shoulder 44 with a reduced inner diameter. Retaining ring 28 has an apertured boss 46 through which screw 40 is received, and an opposite boss 48 for receiving and securing the sharp threaded end of the screw 40. Locking ring 38 has a pair of opposed slots 50 and 52 terminating in screw-receiving holes 54 and 56. In assembly, retaining ring 28 is slid onto tube 12, locking ring 38 is fitted into tube end 30 so that it is just flush with the terminus of the end 30, and then the retaining ring 28 is pulled toward the end 30 until the engagement position illustrated in FIG. 3 is attained, with tube end 30 being squeezed between flange 42 and shoulder 44. Then, screw 40 is inserted fully into the position shown in FIG. 4, thereby locking the retaining ring 28 of the buckle 26 to the tube end 30. The retaining ring 24 is secured similarly to the other end of the tube 12. The housing 18 is provided with a convenience ring 58 for attachment of a pet leash or other device.

This invention has been described in its presently contemplated best mode, and it is clear that it is susceptible of numerous modifications, modes and embodiments within the ability of those skilled in the art and without the exercise of the inventive faculty. Accordingly, the scope of this invention is defined by the scope of the following claims.

What is claimed is:

1. An illuminated collar comprising: a hollow flexible light-permeable tube having first and second ends, a plurality of lights mounted within said tube;

a housing mounted on said first tube end, said housing having a compartment for containing circuit means for operating said lights and for containing battery means for providing power for said circuit means and said lights;

a buckle including a retaining ring mounted on said second tube end, a connector strap projecting from said retaining ring, and a plurality of buckle holes in said connector strap; and a plurality of catch pins projecting from said housing so that said catch pins and said buckle holes are selectively engageable and disengageable for connecting and disconnecting said first and second tube ends with respect to each other.

2. The illuminated collar of claim 1 further including:

a locking ring fittable into said second tube end; and a screw insertable through said retaining ring, said second tube end and said locking ring whereby said retaining ring is secured to said second tube end.

3. The illuminated collar of claim 2 wherein:

said locking ring has a flange, said flange has a reduced outer diameter, a screw-receiving hole in said locking ring, and a slot in said flange terminating at said hole; and said retaining ring has an inner shoulder, and said shoulder has a reduced inner diameter so that, when assembled on said second tube end, said retaining ring shoulder and said locking ring flange squeeze said second tube end therebetween.

* * * * *